(12) United States Patent
Abu Lebdeh et al.

(10) Patent No.: US 10,944,621 B2
(45) Date of Patent: Mar. 9, 2021

(54) ORCHESTRATOR FOR A VIRTUAL NETWORK PLATFORM AS A SERVICE (VNPAAS)

(71) Applicants: Mohammad Abu Lebdeh, Montreal (CA); Roch Glitho, Ville Saint-Laurent (CA); Constant Wette Tchouati, Montreal (CA)

(72) Inventors: Mohammad Abu Lebdeh, Montreal (CA); Roch Glitho, Ville Saint-Laurent (CA); Constant Wette Tchouati, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 202 days.

(21) Appl. No.: 16/300,326

(22) PCT Filed: May 9, 2016

(86) PCT No.: PCT/IB2016/052644
§ 371 (c)(1),
(2) Date: Nov. 9, 2018

(87) PCT Pub. No.: WO2017/194990
PCT Pub. Date: Nov. 16, 2017

(65) Prior Publication Data
US 2019/0109756 A1 Apr. 11, 2019

(51) Int. Cl.
*H04L 12/24* (2006.01)
*G06F 9/50* (2006.01)
*G06F 9/455* (2018.01)

(52) U.S. Cl.
CPC ...... *H04L 41/0286* (2013.01); *G06F 9/45558* (2013.01); *G06F 9/5077* (2013.01);
(Continued)

(58) Field of Classification Search
None
See application file for complete search history.

(56) References Cited

U.S. PATENT DOCUMENTS 9,806,979 B1 * 10/2017 Felstaine ............. H04L 41/0893
10,003,498 B2 * 6/2018 Shevenell ........... H04L 41/0816
(Continued)

OTHER PUBLICATIONS

ETSI GS NFV 002, V1.1.1: Network Functions Virtualisation (NFV); Architectural Framework; Oct. 2013; 21 pages.
(Continued)

*Primary Examiner* — Backhean Tiv
(74) *Attorney, Agent, or Firm* — Ericsson Canada Inc.; Julie Dufort

(57) ABSTRACT

The disclosure relates to an orchestrator, for a Virtual Network Platform as a Service (VNPaaS), which orchestrates the management of a Network Service (NS). The orchestrator is operative to select an orchestration zone for each of a plurality of Virtual Network Functions (VNFs) in the NS based on selected deployment locations, where each orchestration zone comprises at least one VNF. The orchestrator is operative to associate sub-services to the selected orchestration zones, the sub-services being obtained from a decomposition of the NS into a number of sub-services equal to a number of orchestration zones selected and each sub-service comprising at least one of the plurality of VNFs. The orchestrator is operative to initiate deployment of the sub-services in the selected orchestration zones.

29 Claims, 7 Drawing Sheets

(52) U.S. Cl.
CPC .......... *H04L 41/00* (2013.01); *H04L 41/0896* (2013.01); *H04L 41/12* (2013.01); *H04L 41/5041* (2013.01); *H04L 41/5058* (2013.01); *G06F 2009/45595* (2013.01)

(56) References Cited

U.S. PATENT DOCUMENTS

| | | | | |
|---|---|---|---|---|
| 10,135,702 | B2* | 11/2018 | Lahiri | H04L 43/12 |
| 10,135,712 | B2* | 11/2018 | Wu | G06F 9/45558 |
| 10,164,914 | B2* | 12/2018 | Rajagopal | H04L 41/12 |
| 10,169,028 | B2* | 1/2019 | Htay | G06F 8/65 |
| 10,193,768 | B2* | 1/2019 | Chawki | H04L 41/5051 |
| 10,284,434 | B1* | 5/2019 | Rajagopal | H04L 41/20 |
| 2014/0298091 | A1* | 10/2014 | Carlen | G06F 9/54 714/15 |
| 2014/0317293 | A1* | 10/2014 | Shatzkamer | G06F 9/45558 709/226 |
| 2015/0277856 | A1* | 10/2015 | Payne | G06F 7/58 708/255 |
| 2016/0006623 | A1* | 1/2016 | Liu | H04L 43/0876 370/254 |
| 2017/0123863 | A1* | 5/2017 | Erickson | G06F 9/54 |
| 2018/0337981 | A1* | 11/2018 | Bogdan | H04L 41/0896 |
| 2019/0097946 | A1* | 3/2019 | Lokman | H04L 45/306 |
| 2019/0109756 | A1* | 4/2019 | Abu Lebdeh | H04L 41/00 |
| 2020/0014561 | A1* | 1/2020 | Koat | H04L 63/0892 |
| 2020/0162345 | A1* | 5/2020 | Vaishnavi | H04L 41/50 |

OTHER PUBLICATIONS

Joao Soares et al.: "Toward a Telco Cloud Environment for Service Functions"; IEEE Communications magazine; Feb. 2015; 9 pages.
Ricard Vilalta et al.: "The SDN/NFV Cloud Computing Platform and Transport Network of the Adrenaline Testbed"; IEEE Apr. 2015; 5 pages.
Rashid Mijumbi et al.: "Management and Orchestration Challenges in Network Functions Virtualization"; IEEE Jan. 2016; 8 pages.
Gregory Katsaros et al.: Cloud Service Orchestration with TOSCA, Chef and Openstack; IEEE Mar. 2014.
G. Xilouris et al.: "T-NOVA: A Marketplace for Virtualized Network Functions"; IEEE 2014; 5 pages.
Hanieh Alipour et al.: "Towards HSS as a Virtualized Service for 5G Networks"; IFIP 2015; 5 pages.
Tianpu Yang: "A New Architecture of HSS Based on Cloud Computing"; IEEE 2011; 5 pages.
Tobias Binz et al.: Institute of Architecture of Application Systems: "OpenTOSCA—A Runtime for TOSCA-based Cloud Applications"; Springer-Verlag 2013; 5 pages.
Joao Soares et al.:"Cloud4NFV: A Platform for Virtual Network Functions"; IEEE 3rd. International Conference on Cloud Networking (CloudNet) 2014; 6 pages.
Fujitsu: "Server Platform Technology that supports reliability and scalability functions for service applications approved as a Proof of Concept by ETSI"; uploaded from the Internet on Mar. 24, 2016; 3 pages.
Fujitsu: "Server Platform Technology that supports reliability and scalability functions for service applications approved as a Proof of Concept by ETSI"; Figure 1. Proposed Proof of Concept: "The Virtual Network Platform as a Service (VNPaaS)"; uploaded from the Internet on Mar. 24, 2016.
ETSI GS NFV-MAN 001, V1.1.1: "Network Functions Virtualisation (NFV); Management and Orchestration"; Dec. 2014; 184 pages.
Fujitsu: "Server Platform Technology that supports reliability and scalability functions for service applications approved as a Proof of Concept by ETSI"; Figure 2. Details of Proposed Proof of Concept; uploaded from the Internet on Mar. 24, 2016.
ETSI GS NFV 001, V1.1.1: Network Functions Virtualisation (NFV); Use Cases' Oct. 2013; 50 pages.

* cited by examiner

ORCHESTRATOR FOR A VIRTUAL NETWORK PLATFORM AS A SERVICE (VNPAAS)

TECHNICAL FIELD

The present disclosure relates to an orchestrator for virtual network platform as a service (VNPaaS).

BACKGROUND

Accelerated research efforts have been undergoing on emerging technologies such as network function virtualization (NFV), software defined networking (SDN) and cloud computing, to address the challenging requirements of the fifth generation (5G) mobile system. These requirements are more diverse compared to those of the previous generations and include high scalability and efficiency in cost, energy and resource usage.

NFV decouples network functions from the underlying proprietary hardware and implements them as applications, the so-called virtualized network functions (VNFs). A network function is a functional block within a network infrastructure with well-defined external interfaces and well-defined functional behavior. The aforementioned decoupling enables to run the VNFs on industry standard hardware, which can be located in various locations such as data centers. This flexibility offers an evolutionary approach in designing, deploying, and managing network services (NSs). In NFV, a NS is defined as a composition of network functions and described by its functional and behavioral specification.

European Telecommunications Standards Institute (ETSI) leads the NFV research activities, which comprise defining management and orchestration (MANO) framework and identifying several NFV use cases which include virtual network platform as a service (VNPaaS). The NFV-MANO consists of an NFV orchestrator (NFVO), NFV managers (NFVM) and virtualized infrastructure managers (VIM). The NFVO is responsible for life cycle management of the NSs. It is also responsible for the global resource management. The NFVM is responsible for managing the life cycle of one or a group of VNF instances of the same type. The VIM is responsible for managing and controlling the compute, storage, and network resources of the network function virtualization infrastructure (NFVI) within one operator's subdomain.

VNPaaS is analogous to platform as a service (PaaS) service model of cloud computing, but targeting network domain. In this context, VNPaaS service provider is expected to provide a toolkit for the customers to provision (e.g. develop, deploy, manage and terminate) their virtual NSs on a pay-per-go model. These services can range from simple services such as home subscriber server (HSS) service to more complex services such as IP multimedia subsystems (IMS).

Current research efforts by ETSI, and others, focus on the centralized NFV management in which one orchestrator manages all NSs. This approach suffers from scalability issues and communication overhead especially when the NSs span across geographically distributed locations.

Although VNPaaS is a PaaS for provisioning NSs, existing IT PaaS solutions today cannot be used in their current capabilities to provision the NSs in network domains. This is related to the differences in requirements between the IT applications targeted by PaaS and NSs targeted by VNPaaS.

SUMMARY

There is provided an orchestration method, for execution by an orchestrator for a Virtual Network Platform as a Service (VNPaaS), to orchestrate the management of a Network Service (NS). The method comprises selecting an orchestration zone for each of a plurality of Virtual Network Functions (VNFs) used in the NS based on selected deployment locations, wherein each orchestration zone comprises at least one VNF. The method comprises associating sub-services to the selected orchestration zones, the sub-services being obtained from a decomposition of the NS into a number of sub-services equal to a number of orchestration zones selected and each sub-service comprising at least one of the plurality of VNFs. The method comprises initiating deployment of the sub-services in the selected orchestration zones.

There is also provided an orchestrator for a Virtual Network Platform as a Service (VNPaaS) operative to orchestrate the management of a Network Service (NS). The orchestrator runs in a cloud computing environment providing processing circuits and memory for running the orchestrator, the memory contains instructions executable by the processing circuits whereby the orchestrator is operative to select an orchestration zone for each of a plurality of Virtual Network Functions (VNFs) used in the NS based on selected deployment locations, wherein each orchestration zone comprises at least one VNF. The orchestrator is further operative to associate sub-services to the selected orchestration zones, the sub-services being obtained from a decomposition of the NS into a number of sub-services equal to a number of orchestration zones selected and each sub-service comprising at least one of the plurality of VNFs. The orchestrator is further operative to initiate deployment of the sub-services in the selected orchestration zones.

There is also provided an orchestrator for a Virtual Network Platform as a Service (VNPaaS) operative to orchestrate the management of a Network Service (NS). The orchestrator comprises a first selection module for selecting an orchestration zone for each of a plurality of Virtual Network Functions (VNFs) used in the NS based on selected deployment locations, wherein each orchestration zone comprises at least one VNF. The orchestrator comprises an association module for associating sub-services to the selected orchestration zones, the sub-services being obtained from a decomposition of the NS into a number of sub-services equal to a number of orchestration zones selected and each sub-service comprising at least one VNF. The orchestrator comprises an initiating module for initiating deployment of the sub-services in the selected orchestration zones.

There is also provided a non-transitory computer readable media having stored thereon instructions for execution by an orchestrator for a Virtual Network Platform as a Service (VNPaaS), to orchestrate the management of a Network Service (NS). The instructions comprise selecting an orchestration zone for a plurality of Virtual Network Functions (VNFs) used in the NS based on selected deployment locations, wherein each orchestration zone comprises at least one VNF. The instructions comprise associating sub-services to the selected orchestration zones, the sub-services being obtained from a decomposition of the NS into a number of sub-services equal to a number of orchestration zones selected and each sub-service comprising at least one of the plurality of VNFs. The instructions comprise initiating deployment of the sub-services in the selected orchestration zones.

There is also provided a Virtual Network Platform as a Service (VNPaaS) system comprising an orchestrator operative to orchestrate the management of a Network Service (NS), the system running in a cloud computing environment providing processing circuits and memory for running the system, the memory containing instructions executable by the processing circuits whereby the orchestrator is operative to select an orchestration zone for each of a plurality of Virtual Network Functions (VNFs) used in the NS based on selected deployment locations, wherein each orchestration zone comprises at least one VNF. The orchestrator is operative to associate sub-services to the selected orchestration zones, the sub-services being obtained from a decomposition of the NS into a number of sub-services equal to a number of orchestration zones selected and each sub-service comprising at least one of the plurality of VNFs. The orchestrator is operative to initiate deployment of the sub-services in the selected orchestration zones.

DETAILED DESCRIPTION

Various features and embodiments will now be described with reference to the figures to fully convey the scope of the disclosure to those skilled in the art.

Many aspects will be described in terms of sequences of actions or functions. It should be recognized that in some embodiments, some functions or actions could be performed by specialized circuits, by program instructions being executed by one or more processors, or by a combination of both.

Further, some embodiments can be partially or completely embodied in the form of computer-readable carrier or carrier wave containing an appropriate set of computer instructions that would cause a processor to carry out the techniques described herein.

In some alternate embodiments, the functions/actions may occur out of the order noted in the sequence of actions. Furthermore, in some illustrations, some blocks, functions or actions may be optional and may or may not be executed; these are generally illustrated with dashed lines.

As stated previously, although VNPaaS is a PaaS for provisioning NSs, Information Technology (IT) PaaS solutions existing today cannot be used in their current capabilities to provision the NSs in network domains. This is related to the differences in requirements between the IT applications targeted by PaaS and NSs targeted by VNPaaS.

Some examples of differences between PaaS capabilities and what is envisioned in VNPaaS are: (1) PaaS encompasses a centralized management of the applications, whereas VNPaaS has a distributed management of NSs, (2) PaaS solutions do not enable the provisioning of applications' components across multiple locations, whereas VNPaaS can provision NSs that includes VNFs deployed across several locations, (3) PaaS use HTTP protocol, whereas VNPaaS use other protocols (e.g. SIP and diameter) to manage VNFs, and (4) PaaS uses best-effort network transport connectivity, whereas VNPaaS uses resource allocation at the network layer, including the wide area network (WAN) connectivity, to ensure predictable performance of the provisioned NSs.

Figure 1:
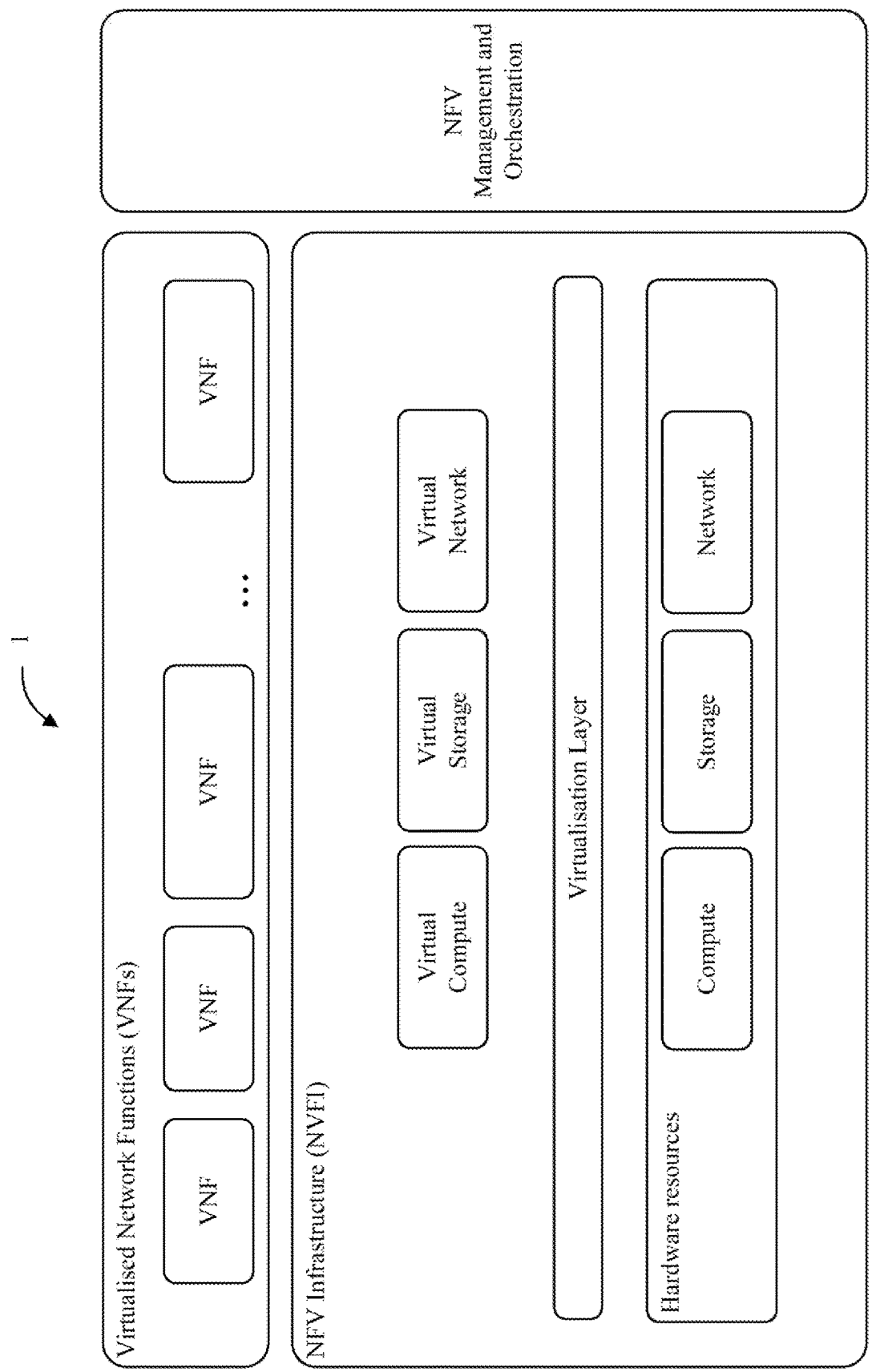
FIG. 1 a schematic illustration of an NFV framework of the prior art that supports centralized NFV management.

FIG. 1 illustrates a framework 1 of the prior art which supports centralized NFV management and that is described in the document entitled "*ETSI GS NFV* 002 *V*1.1.1 (2013-10) *Network Functions Virtualisation (NVF); Architectural Framework*". Such centralized NFV management would suffer from scalability problems, especially if the NSs were deployed on distributed NFV infrastructure (NFVI), e.g. due to communication overhead. A centralized NFV management would also lag in getting the state of NSs and VNFs and the system would not be able to react efficiently and quickly to changes in NFV environment (e.g. in case of VNF instance failure).

Figure 2:
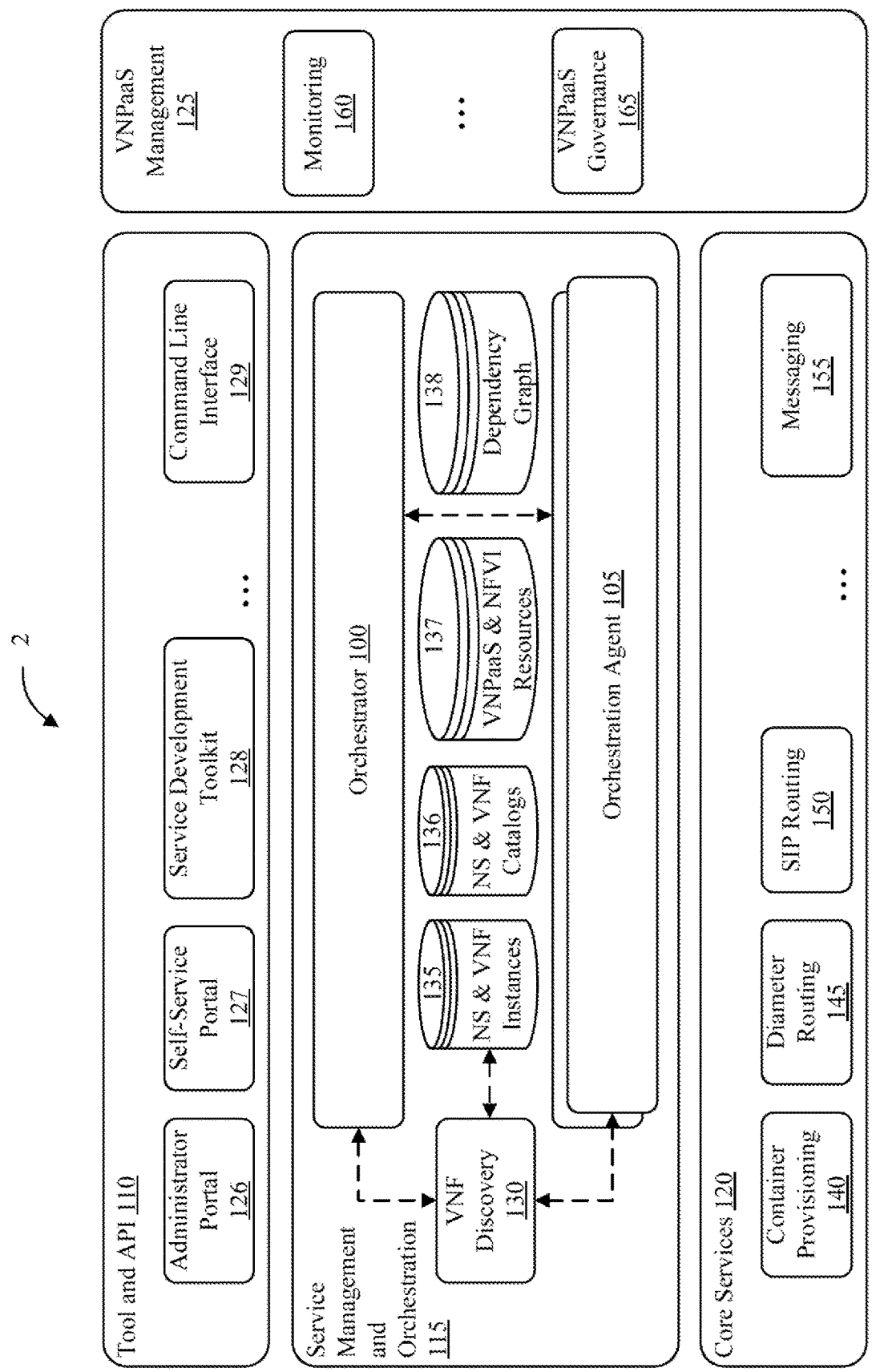
FIG. 2 is a schematic illustration of a new architecture for VNPaaS that supports distributed NFV management.

This disclosure therefore presents a new architecture 2 for VNPaaS, as illustrated in FIG. 2, to provision (e.g. develop, deploy, manage and terminate) 3GPP networks as a service, which overcomes the limitations of current centralized NFV management and IT PaaS. The proposed architecture leverages VNF discovery to compose the network service from several VNFs deployed in distributed orchestration zones.

The new architecture also meets some requirements specific to VNPaaS. The first requirement is that VNPaaS should run on distributed network function virtualization infrastructure (NFVI) which consists of several geographically distributed NFVI points of presence (NFVI-PoPs). The main motivation behind this is to reduce latency by placing the NSs closer to end-users, in order to improve the quality of experience.

The second requirement is to support distributed NFV management that can scale elastically in response to a time-varying workload. The distributed management should allow performing the life cycle management operations closer to the NSs, VNFs and hosting environment in order to improve scalability and reduce the communication overhead, especially for the operations frequently executed.

The third requirement is that the VNPaaS should automate the life cycle management. This automation should take into account the fact that VNFs vary in their requirements such as network connectivity requirements (e.g. bandwidth and quality of service [QoS]) and security.

The last requirement is related to deployment models. VNFs have different deployment models; they can be deployed on bare-metal (i.e., physical resources) and virtual resources (e.g. virtual machines). Each of these deployment model guarantees different levels of security, isolation and performance. The VNF requirements (e.g. security and frameworks), which are aligned with the intended service level agreement (SLA), are used to determine the deployment model. Therefore, VNPaaS should support hybrid deployment models and allow deploying VNFs on both physical and virtual resources.

The architecture 2 focuses on providing mechanisms for a distributed life cycle management of NSs and VNFs.

Life-cycle management refers here to the functions required for the deployment, management (i.e. maintenance) and termination of NSs or VNFs.

According to an embodiment, the architecture 2 uses Topology and Orchestration Specification for Cloud Applications (TOSCA) to describe the VNFs and NSs regardless of their complexities, and to automate their deployment and management. A person skilled in the art would understand that the method and concepts presented herein could be applied using an alternative standard and/or descriptive language which can offer similar capabilities.

TOSCA is a standard from the Organization for the Advancement of Structured Information Standards (OASIS) that describes cloud applications by means of service templates and management plans, which enables a TOSCA orchestration engine (a.k.a. TOSCA orchestrator) to automate the applications' deployment and management. The TOSCA orchestration engine is a tool that can parse and interrupt a TOSCA service template to instantiate, deploy and manage the described application in the cloud. Furthermore, OASIS specified in the specification draft of TOSCA NFV profile how to describe a NFV specific data model (e.g. VNF), as proposed by the European Telecommunications Standards Institute (ETSI), using TOSCA.

The architecture 2 proposes distributed NFV management i.e. Service Management and Orchestration Layer. To realize the distributed management, the architecture 2 breaks down the NFVI into logical partitions called orchestration zones (this decomposition is changed over time as will be discussed later, i.e. it is not static). Each zone is managed by an orchestration agent 105 which is responsible for managing the NSs and VNFs deployed within its borders, under the instruction of the orchestrator 100. Each orchestration zone might have a coarser or a finer granularity of an NFV-PoP. This depends on the key performance indicators (KPIs) and policies used to manage them. The main motivation behind this decomposition is to distribute the NFV management and orchestration responsibilities and place the management functional components (i.e. orchestration agents) close to the hosting environment and the NSs and VNFs. The orchestrator 100 maintains a global view of the system, so it can control the management of end-to-end NSs. Since a NS might include VNFs deployed in different orchestration zones, the orchestrator 100 decomposes the NS into smaller services (so-called sub-services) to fit into each orchestration zone. Then, it leverages the service discovery concept to compose the NSs deployed in different zones in order to offer the end-to-end NS.

The orchestrator 100 can use different criteria, for decomposing the NFVI into zones, such as location, scaling out/in the management capacity (for instance, if the current orchestration agents cannot handle new workload, new zones are created to scale out the system), or the technology used in NFVI-PoPs. Different NFVI-PoPs may use different technologies such as OpenStack, VMware, etc. and may have a special orchestration agent for each technology. However, location is the first criterion that is considered to define the orchestration zones, because the orchestrator takes into account a need for the orchestration agents to be located close to the deployed VNFs (though some KPIs) so that it can react efficiently to changes in NFV environment.

Furthermore, the orchestrator 100 is responsible for zones management and for maintaining a global view of the entire system. It continuously adapts to the dynamism and variability in the distributed NFV environment (e.g., providing a service scaling). This includes using predefined policies and KPIs to continuously optimize the orchestration zones by creating new zones (including instantiating an orchestration agent 105 for each new zone), and deleting and reshaping existing zones. The orchestrator 100 may also move the management responsibilities of some or all NSs and VNFs from one orchestration agent 105 to another to adapt to the changes in orchestration zones (e.g. when a zone is deleted or reshaped).

Still referring to FIG. 2, the architecture presents several layers, namely the Tool and API layer 110, the Service Management and Orchestration layer 115, the Core Services layer 120 and the VNPaaS Management layer 125.

The Tool and API layer 110 includes different tools and application programming interfaces (APIs) to access the VNPaaS capabilities and functions. Administrator Portal 126 is a graphical user interface that allows the VNPaaS's administrators to control, manage, configure and monitor the VNPaaS environment.

Self-Service Portal 127 is a graphical user interface that exposes VNPaaS functionalities (e.g. service deployment and management) and provides them as self-service capabilities to end-users.

Service Development Toolkit 128 is a set of tools that allow end-users to easily develop and build network services.

Command Line Interface 129 is exposes VNPaaS functionalities and administration capabilities and offers them through a command-line tool.

The Service Management and Orchestration layer 115 is responsible for managing life cycle of the NSs. It encompasses the orchestrator 100, orchestration agents 105, a VNF discovery engine 130 and repositories 135, 136, 137, 138. The orchestrator 100 is mainly responsible managing the NSs and the orchestration zones (not illustrated). An orchestration zone is a logical partition within a NFVI in which the VNPaaS runs. In fact, the orchestrator 100 divides the NFVI into several orchestration zones according to predefined policy (e.g. performance requirements). For instance, one or few of NFVI-PoPs might be considered as an orchestration zone. Each orchestration zone is managed by an orchestration agent 105. The orchestration agent 105 is a TOSCA orchestration engine that can deploy and manage the NSs as described by TOSCA service templates. It is responsible for managing NSs within its zone under the instruction of the orchestrator 100. As explained previously, a person skilled in the art would understand that an alternative orchestration engine could be used in a similar manner.

Although the orchestrator may use TOSCA service templates to deploy and manage the network services, the details in the templates can vary and depend on the complexity and capabilities implemented in the orchestrator. For a simple orchestrator, the service template should include all the details (e.g. placement and number of VNF instances) required to satisfy the end-user requirements, since the orchestrator only deploys and manages the network service according to the template description. In a more advanced and complex orchestrator, the orchestrator can use end-user high-level requirements (e.g. latency and throughput), VNF descriptions and service template with a high-level description, which only describes the VNFs connectivity topology, to build a detailed service template that can satisfy the end-user requirements.

The VNF discovery engine 130 is responsible for logically centralizing VNF instances information into a common registry and providing easy publish/discover functionality (under the instruction of the orchestrator 100). It is used in composing NSs from VNFs managed by different orchestration agents 105.

The orchestrator 100 and orchestration agents 105 use four categories of repositories 135, 136, 137, 138 to support their functions. The NS & NFV instances repository 135 describes the deployed NS and VNF instances. The NS & NFV catalogs repository 136 holds information (e.g. descriptions) about NSs and VNFs. Catalogs in this context means a list of NSs and VNFs and may be stored in the form of a database. The VNPaaS and NFVI resources repository 137 holds information (e.g. descriptions and locations) about reserved and available resources. The dependency graph repository 138 contains graph structures that represent relations among main architecture's components (e.g. VIMs, orchestration agents, NSs instances and VNF instances). It allows to easily handle large scale dependencies between components and it allows to keep track of the system evolution and performance.

The Core Services layer 120 contains services that are hosted and managed by the VNPaaS. The container provisioning 140 is a distributed service for provisioning and scheduling containers. It is used to deploy VNFs packaged as containers. Diameter routing 145 and session initiation protocol (SIP) Routing 150 are signaling protocols used in 3GPP mobile systems. Therefore, many of the prospective VNFs may support diameter and/or SIP interfaces. VNPaaS includes diameter routing and SIP routing services to control and manage the diameter and SIP signaling respectively. These services can distribute incoming signaling traffic across multiple VNF instances to enable horizontal scalability. Furthermore, Messaging 155 is a distributed queueing and messaging service for internal communication between VNPaaS's components. It is mainly used to transfer the collected monitoring metrics asynchronously.

The VNPaaS Management layer 125 is a vertical layer which interacts simultaneously with the three other layers 110, 115, 120. It includes components that are responsible for the management functions related to the VNPaaS. An example of such component is Monitoring 160 which is responsible for monitoring resource consumption and health and key performance indicators (KPIs) of VNPaaS components. It contains metric repository to store monitoring data collected from VNPaaS components as well as deployed VNFs (collected by orchestration agent).

VNPaaS Governance 165 encompasses all modules that implement the business rules and the economic model of VNPaaS such as users management, authentication, authorization, accounting (e.g. metering and billing) and could implement other similar function as would be apparent to a person skilled in the art.

A person skilled in the art would understand that at least some of the components and services presented in relation to FIG. 2 could be replaced with alternative components and services, that some of the components and services may be optional, and that other components and services could be added, as needed.

Figure 3:
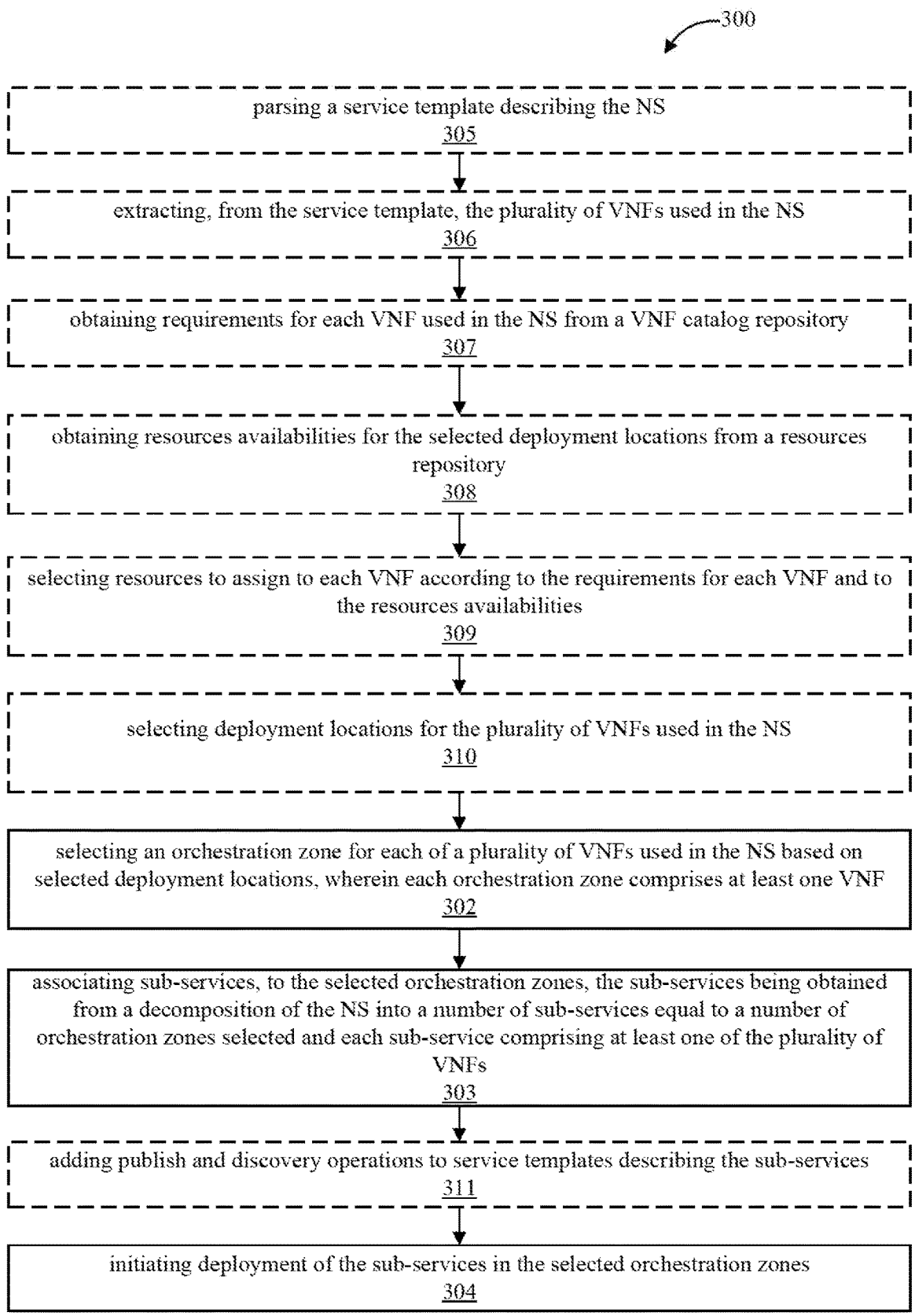
FIG. 3 is a flowchart of a method according to an embodiment.

FIG. 3 illustrates an orchestration method 300, for execution by an orchestrator for a Virtual Network Platform as a Service (VNPaaS), to orchestrate the management of a Network Service (NS).

The method comprises selecting an orchestration zone for each of a plurality of Virtual Network Functions (VNFs) used in the NS based on selected deployment locations, wherein each orchestration zone comprises at least one VNF, step 302.

The method also comprises associating sub-services to the selected orchestration zones, the sub-services being obtained from a decomposition of the NS into a number of sub-services equal to a number of orchestration zones selected and each sub-service comprising at least one of the plurality of VNF, step 303. The orchestrator may decompose the NS into the sub-services, or the decomposition may be handled by another entity and provided to the orchestrator. The method comprises initiating deployment of the sub-services in the selected orchestration zones, step 304.

The method executed by the orchestrator may further comprise, before the step of selecting 302, parsing a service template describing the NS, step 305 and extracting, from the service template, the plurality of VNFs used in the NS, step 306. The method may further comprise obtaining requirements for each VNF used in the NS from a VNF catalog repository, step 307 and obtaining resources availabilities for the selected deployment locations from a resources repository, step 308. The orchestrator can access, for example, VNPaaS & NFVI resources repository 137 to check the resources description and availability.

The method also comprises selecting resources to assign to each VNF according to the requirements for each VNF and to the resources availabilities, step 309. The resources can comprise compute, storage, QoS and bandwidth). The requirements for each VNF can comprise deployment requirements, operational requirements and behavioral requirements. The orchestrator may translate the high-level requirements of end-users (e.g. throughput and latency) into network connectivity (i.e. network link) requirements (e.g. QoS and bandwidth) and/or VNFs requirements (e.g. placement, resource allocation, number of instances). This can be done using knowledge management techniques or machine learning techniques to generate a Topology and Orchestration Specification for Cloud Applications (TOSCA) model that describes each VNF requirements and network requirements and updating the service template to include the generated TOSCA model.

The method further comprises selecting deployment locations for the plurality of VNFs used in the NS, step 310.

In the method, each sub-service may be described by a sub-service template. The method may therefore further comprise, before the step 304 of initiating deployment, adding publish and discovery operations to the sub-service templates, thereby providing operations to be used for composition of the sub-services to generate the NS, step 311.

If a deployment location has more than one orchestration zone, only one orchestration zone is selected based on a predefined criterion. The predefined criterion may be such as selecting an orchestration zone which includes a minimum number of VNFs or the selection of the orchestration zone can be based on resources types available, such as VMs and containers.

The service template for each sub-service may be built based on the service template describing the NS. The step 304 of initiating deployment of the sub-services can comprise instructing orchestration agents in the selected orchestration zones to deploy and manage the sub-services. The orchestration agents then invoke the life cycle operations of the TOSCA nodes and relationships defined in the service templates in the right order based on their dependencies. Lifecycle operations executed by the orchestration agents may comprise allocating resources by instantiating Virtual Machines (VMs), installing executable files for each VNF on selected VMs, configuring communication for each VNF and starting operation of each VNF, as would be apparent to a person skilled in the art.

The publish operation, described previously in relation to step 311, may be added to the sub-service template by adding a new TOSCA node, called VNF record, when a VNF is to be accessed by another VNF deployed in a different orchestration zone. The discovery operation may be added to the sub-service template by adding a new TOSCA node, called discoverable service, when a VNF accesses another VNF deployed in different orchestration zone.

These operations are fully managed by the VNPaaS and transparent to the deployed VNFs. The orchestration agents execute publish and discovery operations as described by the template. In the publish operation, the orchestration agents publish the information of their deployed VNF instances such as but not limited to, VNF types and metadata of the connection points (e.g. IP and port). In the discovery operation, the orchestration agents get the information of VNFs instances with which their locally managed VNFs will communicate. Then, they make this information available for life cycle operations such as the configure operation.

Therefore, the orchestrator adds the publish and/or discovery operations to the service template describing the sub-services as required, so that the composition of the sub-services will lead to the desired/original network service. A publish operation is added to the sub-service which includes a VNF that will be accessed by another VNF deployed in different orchestration zone. It is added by adding a new TOSCA node, called "VNF record", with its appropriate configurations to the service template. Then the VNF node, to be published, is connected to the "VNF record" node via special TOSCA Connect-to relationship. The implementation of this node and relationship ensures that the orchestration agent publishes the information of the VNF instance by creating a record for each in the VNF discovery engine.

Furthermore, a discovery operation is added to the sub-service which includes a VNF that will access another VNF deployed in different orchestration zone. It is added by adding a new TOSCA node, called "discoverable service", with its appropriate configurations to the service template. Then the VNF node, which should be connected to a VNF in a different zone, is connected to the "discoverable service" node via special TOSCA Connect-to relationship. This node provides an abstract view of the service the VNF should access. The implementation of this node and relationship ensures that the orchestration agent queries the VNF discovery engine to get the details of this service (i.e. discovery operation).

Figures 4A, 4B, 4C:
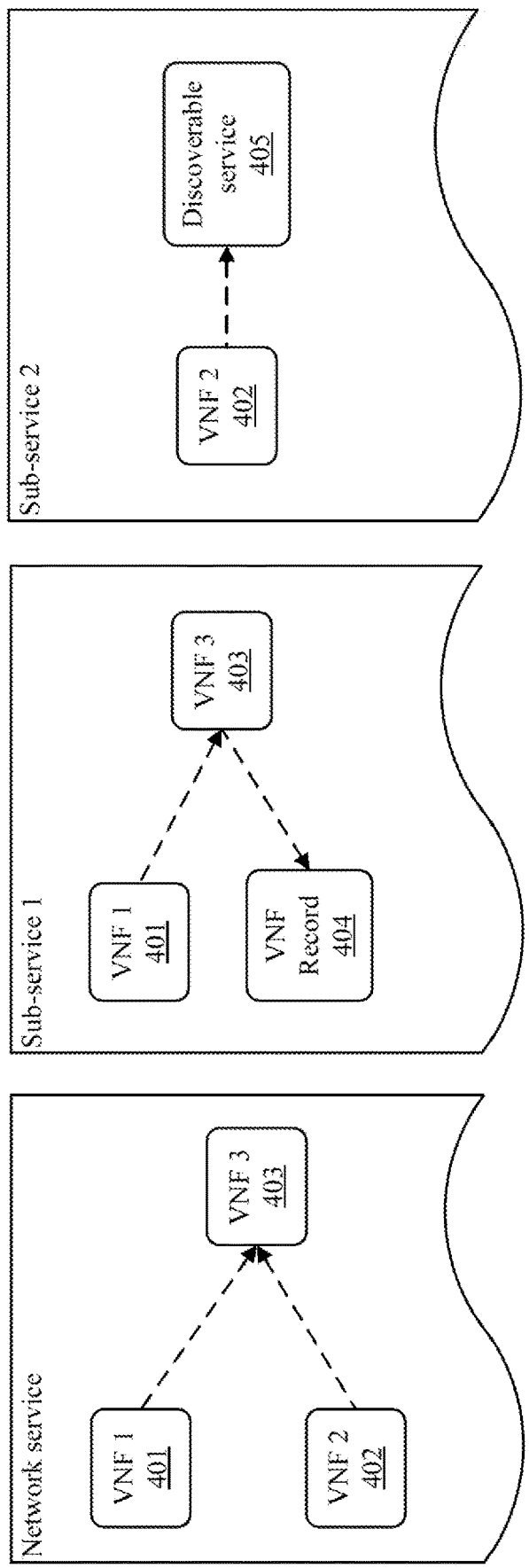
FIGS. 4a to 4c are schematic illustrations of a network service and corresponding sub-services according to an example embodiment.
Figure 5:
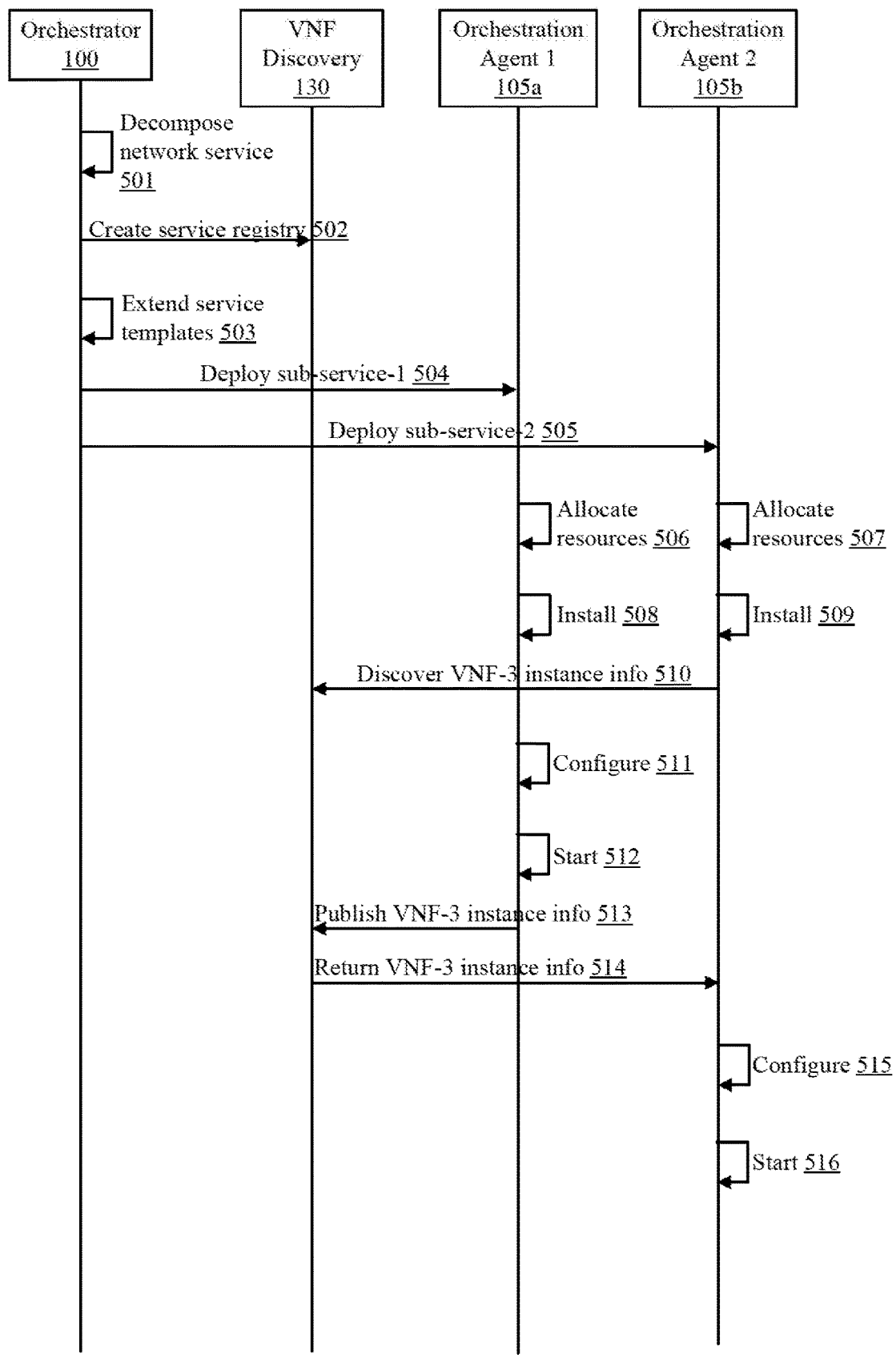
FIG. 5 is a signaling flow according to an example embodiment.

The method is now exemplified in conjunction with an example illustrated in FIGS. 4 and 5. Let assume that the orchestrator deploys a network service which is constituted of three VNFs called VNF-1 401, VNF-2 402 and VNF-3 403. FIG. 4*a* show the high-level topology of this network service (in TOSCA, topology is part of the service template). FIG. 4*a* shows that VNF-1 401 and VNF-2 402 are connected to VNF-3 403.

In this scenario, we assume that the VNPaaS has two orchestration zones (i.e. it has two orchestration agents) and that VNFs are deployed on VMs. We also assume that VNF-1 401 and VNF-3 403 are deployed in orchestration zone-1 whereas VNF-2 402 is deployed in orchestration zone-2.

To deploy the network service, the orchestrator decomposes the network service into two sub-services as will be described in conjunction with the algorithm of FIG. 5. Each sub-service is described by its own sub-service template.

FIGS. 4*b* and 4*c* show the high-level topology of sub-service-1 and sub-service-2 respectively. Sub-service-1 includes the VNF-1 401 and VNF-3 403 nodes (i.e., VNFs deployed in zone 1). In addition, the orchestrator connects VNF-3 403 to a new inserted node called VNF record 404. This means that the orchestration agent-1, which is associated with orchestration zone-1 will publish the information of the VNF-3 instance by creating a record for the VNF-3 in the VNF discovery engine (i.e., publish operation).

Sub-service-2 includes only VNF-2 402. In addition, the VNF-2 node is connected to a new inserted node called discoverable service 405. This discoverable service node provides an abstract view of the service offered by VNF-3 instances. The orchestration agent-2 queries the VNF discovery engine to get the details of this service (i.e., discovery operation).

FIG. 5 illustrates a high-level sequence diagram for the deployment of the above described service using the proposed VNPaaS.

Before the orchestrator 100 deploys the network service, it first decomposes the service template into two smaller sub-services, step 501. Then it initializes a service registry in the VNF discovery engine to configure the composition of the two sub-services, step 502. The orchestrator extends the service templates of the sub-services to include publish and discovery operations of VNFs at step 503. Then, the orchestrator 100 asks the orchestration agents 105*a* and 105*b* to deploy and manage their respective subservices (described in associated templates), steps 504 and 505. The orchestration agents will invoke the life cycle operations of the TOSCA nodes and relationships defined in the service templates in the right order based on their dependencies. The orchestration agents 105*a* and 105*b* start executing the template by allocating resources, steps 506 and 507 (e.g. by instantiating VM) for the VNFs (VNF-1 401, VNF-2 402 and VNF-3 403).

The orchestration agents 105*a* and 105*b*, then start executing the life cycle operations for the VNF nodes (VNF-1 401, VNF-2 402 and VNF-3 406), VNF record 404 node and discoverable service 405 node, which will be detailed in steps 508 to 516.

During the execution of the life cycle operations, the orchestration agents 105*a* and 105*b* may install VNFs (VNF-1 401, VNF-2 402 and VNF-3 403) binary files, steps 508 and 509.

VNF-2 402 is connected to the discoverable service 405 node in sub-service 2. Thus, the orchestration agent 2 105*b* starts a discovery operation to get the information of VNF-3, step 510. However, since the requested information is still not available, VNF discovery engine blocks the request until the information becomes available (request has timeout).

Meanwhile, the orchestration agent-1 continues running the life cycle operations of VNF-1 401 node, VNF-3 403 node and VNF record 404, which includes configure and start operations, steps 511 and 512 respectively. The configure operation of VNF-1 401 instance includes updating the configurations (e.g. IP and port) required to communicate with the VNF-3 403 instance, step 511.

When the orchestration agent-1 invokes the start operation of the VNF record 404, step 512, the orchestration agent-1 publishes the information of VNF-3 403 instance to the VNF discovery 130 engine, step 513. When the VNF-3 403 information becomes available in the VNF discovery engine 130, the discovery request initiated by orchestration agent-2 (at step 510) returns the VNF-3 403 instance information, step 514. Then, orchestration agent-2 105*b*, runs configure and start operations for VNF-2 402 instance, steps 515 and 516 respectively. The configure operation of VNF-2 402 instance includes using the information returned by discovery operation (e.g. IP and port) to update the VNF-2 configurations required to communicate with the VNF-3 403 instance.

Figure 6:
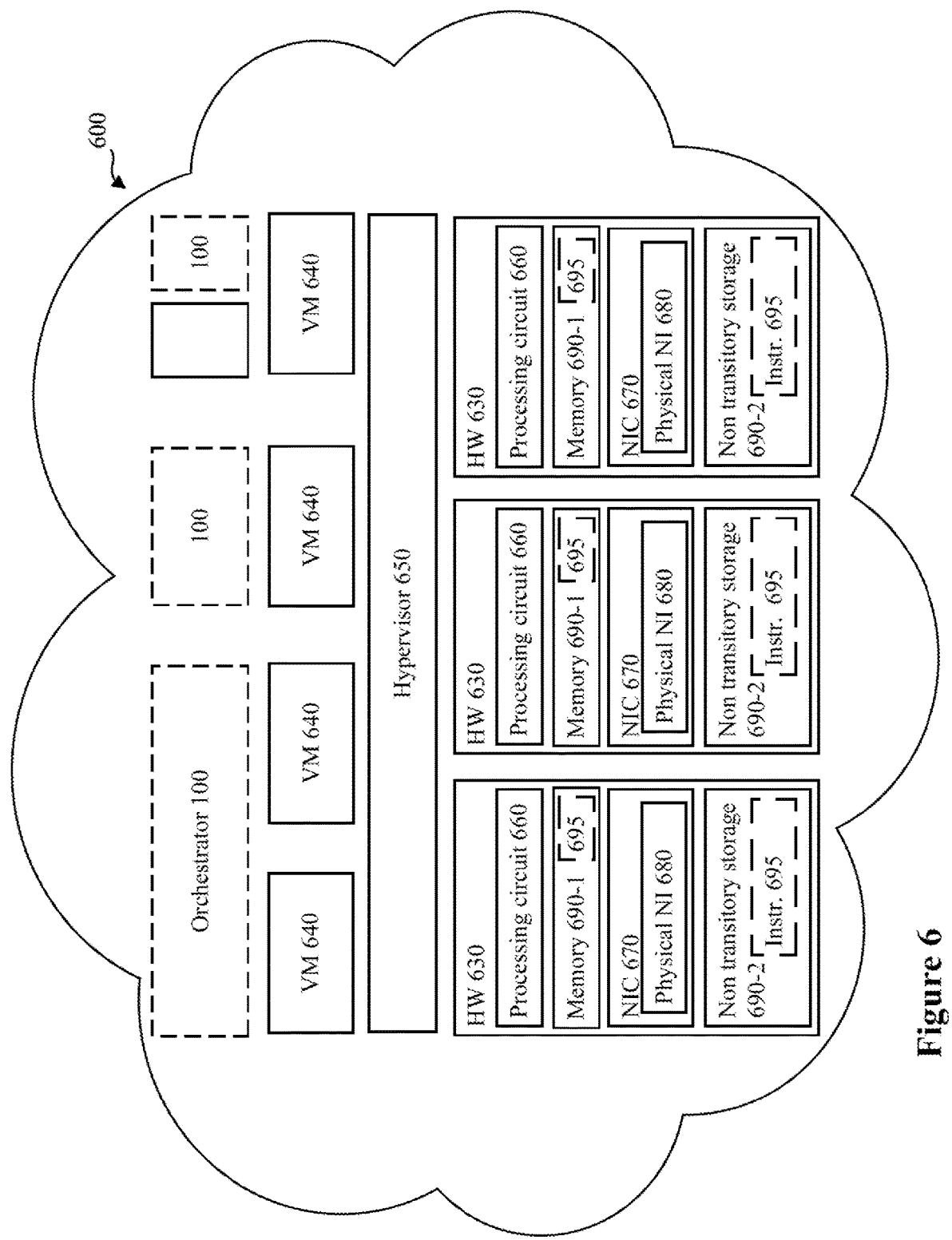
FIG. 6 is a schematic illustration of a cloud computing environment in which embodiments can be deployed.

Turning now to FIG. 6, according to another embodiment, there is provided an orchestrator 100 for a Virtual Network Platform as a Service (VNPaaS) operative to orchestrate the management of a Network Service (NS), the orchestrator running in a cloud computing environment 600 providing processing circuits 660 and memory 690 for running the orchestrator 100. The memory 690 contains instructions executable by the processing circuits 660 whereby the orchestrator 100 is operative to execute the method as illustrated in FIG. 3 and described previously. It should be noted that in the embodiment of FIG. 6 there is only one orchestrator provided to overview orchestration agents distributed in many zones. An example of a zone may be a cluster of machines, a city, a country or any other suitable manner of dividing space or equipment. Having a plurality of orchestrators illustrated in dashed lines in FIG. 6 solely illustrate that an orchestrator can alternatively operate on a fraction of a VM, on one VM or on a plurality of VMs.

The cloud computing environment 600, comprises a general-purpose network device including hardware 630 comprising a set of one or more processor(s) or processing circuits 660, which can be commercial off-the-shelf (COTS) processors, dedicated Application Specific Integrated Circuits (ASICs), or any other type of processing circuit including digital or analog hardware components or special purpose processors, and network interface controller(s) 670 (NICs), also known as network interface cards, which include physical Network Interface 680. The general-purpose network device also includes non-transitory machine readable storage media 690-2 having stored therein software 695 and/or instructions executable by the processing circuit(s) 660. During operation, the processing circuit(s) 660 execute software 695 to instantiate a hypervisor 650, sometimes referred to as a virtual machine monitor (VMM), and one or more virtual machines 640 that are run by the hypervisor 650. A virtual machine 640 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 640, and that part of the hardware 630 that executes that virtual machine, be it hardware dedicated to that virtual machine and/or time slices of hardware temporally shared by that virtual machine with others of the virtual machine(s) 640, forms a separate virtual network element(s) (VNE).

The hypervisor 650 may present a virtual operating platform that appears like networking hardware to virtual machine 640, and the virtual machine 640 may be used to implement functionality such as control communication and configuration module(s) and forwarding table(s), this virtualization of the hardware is sometimes referred to as network function virtualization (NFV). Thus, NFV may be used to consolidate many network equipment types onto industry standard high volume server hardware, physical switches, and physical storage, which can be located in Data centers, and customer premise equipment (CPE). Different embodiments of the orchestrator 100 may be implemented on one or more of the virtual machine(s) 640, and the implementations may be made differently.

Figure 7:
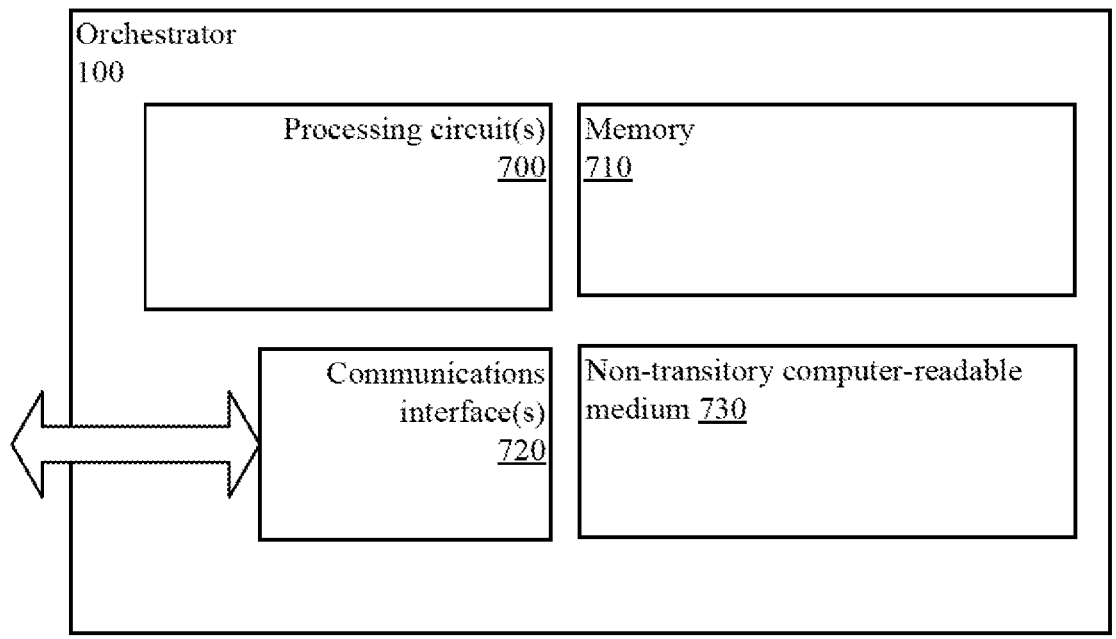
FIGS. 7 and 8 are schematic illustrations of network nodes according to some embodiments.

Turning to FIG. 7, the orchestrator 100 for a Virtual Network Platform as a Service (VNPaaS) operative to orchestrate the management of a Network Service (NS), may be implemented in a network node. The orchestrator 100 comprises processing circuits 700 and memory 710 for running the orchestrator, the memory 710 containing instructions executable by the processing circuits whereby the orchestrator is operative to execute the method as illustrated in FIG. 3 and described previously.

The orchestrator 100 of FIG. 7 may be suitable for implementing aspects of the embodiments disclosed herein. The orchestrator 100 includes a communications interface 720. The communications interface 720 generally includes analog and/or digital components for sending and receiving communications to and from other nodes, either directly or via a network. Those skilled in the art will appreciate that the block diagram of the orchestrator 100 necessarily omits numerous features that are not necessary for a complete understanding of this disclosure.

Although all of the details of the orchestrator 100 are not illustrated, the orchestrator 100 may comprise one or several general-purpose or special-purpose processors 700 or other microcontrollers programmed with suitable software programming instructions and/or firmware to carry out some or all of the functionality of the orchestrator 100 described herein. In addition, or alternatively, the orchestrator 100 may comprise various digital hardware blocks (e.g. one or more Application Specific Integrated Circuits [ASICs], one or more off-the-shelf digital or analog hardware components, or a combination thereof) (not illustrated) configured to carry out some or all of the functionality of the orchestrator 100 described herein. A memory 710, such as a random access memory (RAM), may be used by the processing circuit(s) 700 to store data and programming instructions which, when executed by the processing circuit(s) 700, implement all or part of the functionality described herein. The orchestrator 100 may also include one or more storage media (not illustrated) for storing data necessary and/or suitable for implementing the functionality described herein, as well as for storing the programming instructions which, when executed on the processing circuit(s) 700, implement all or part of the functionality described herein. One embodiment of the present disclosure may be implemented as a computer program product that is stored on a non-transitory computer-readable storage medium 730, the computer program product includes programming instructions that are configured to cause the processing circuit(s) 700 to carry out the steps described herein whereby the orchestrator executes the method as illustrated in FIG. 3 and described previously.

Figure 8:
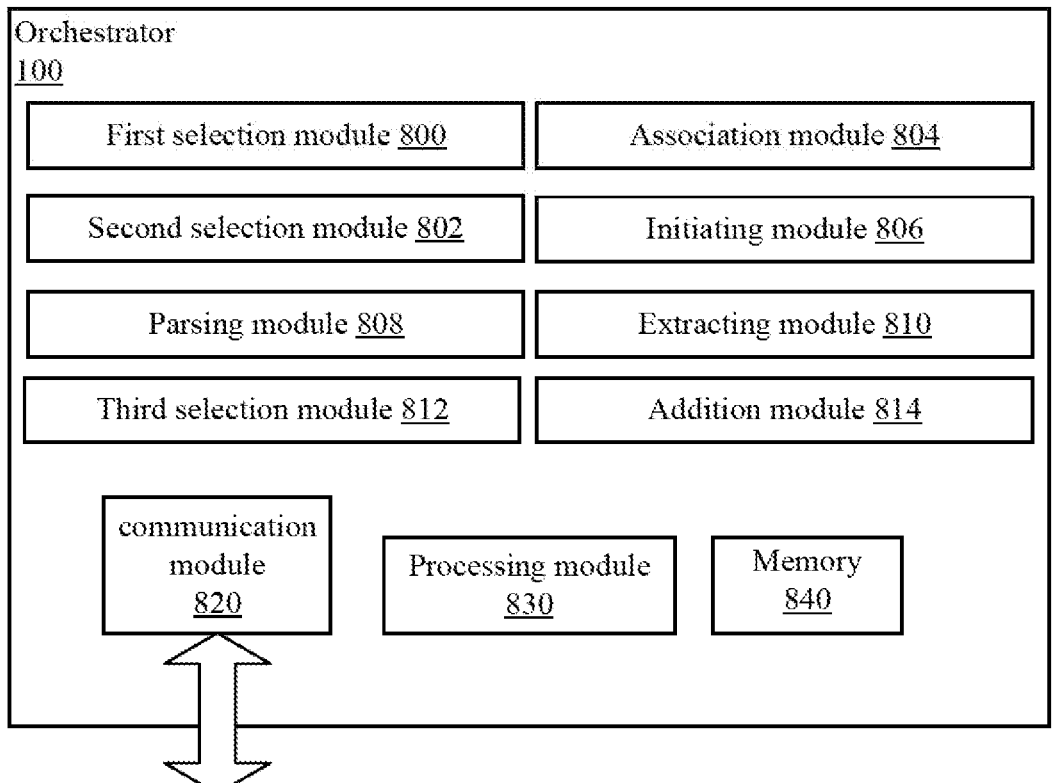

Turning to FIG. 8, there is provided an orchestrator 100 for a Virtual Network Platform as a Service (VNPaaS) operative to orchestrate the management of a Network Service (NS). The orchestrator comprises a first selection module 800 for selecting an orchestration zone for each of a plurality of Virtual Network Functions (VNFs) used in the NS based on selected deployment locations, wherein each orchestration zone comprises at least one VNF. The orchestrator comprises an association module 804 for associating sub-services to the selected orchestration zones, the sub-services being obtained from a decomposition of the NS into a number of sub-services equal to a number of orchestration zones selected and each sub-service comprises at least one VNF. The orchestrator comprises an initiating module 806 for initiating deployment of the sub-services in the selected orchestration zones.

The orchestrator may further comprise a parsing module 808 for parsing a service template describing the NS, an extracting module 810 for extracting, from the service template, the plurality of VNFs used in the NS. The orchestrator may further comprise a communication module 820 for obtaining requirements for each VNF used in the NS from a VNF catalog repository. The communication module 810 can further be for obtaining resources availabilities for the selected deployment locations from a resources repository. The orchestrator may further comprise a second selection module 802 for selecting resources to assign to each VNF according to the requirements for each VNF and to the resources availabilities and a third selection module 812 for selecting the deployment locations for the plurality of VNFs used in the NS. The orchestrator may further comprise an addition module 814 for adding publish and discovery operations to service templates describing the sub-services, thereby providing operations to be used for composition of the sub-services to generate the NS.

The orchestrator 100 may further comprise an I/O module 820, a processing module 830 and a memory 840.

Referring back to FIG. 6 or 7, there is provided a non-transitory computer readable media 690, 730 having stored thereon instructions for execution by an orchestrator for a Virtual Network Platform as a Service (VNPaaS), to orchestrate the management of a Network Service (NS), whereby the orchestrator is operative to execute the method as illustrated in FIG. 3 and described previously.

Referring back to FIG. 2, there is provided a Virtual Network Platform as a Service (VNPaaS) system 2 comprising an orchestrator 100 operative to orchestrate the management of a Network Service (NS), the system 2 running in a cloud computing environment providing processing circuits and memory for running the system, the memory containing instructions executable by the processing circuits whereby the orchestrator is operative to execute the method as illustrated in FIG. 3 and described previously.

The proposed VNPaaS support new features that are missing in existing PaaS solutions. It can run on distributed network function virtualization infrastructure (NFVI) which spans across several geographically distributed locations, the NFVI consisting of several geographically distributed NFVI points of presence (NFVI-PoPs) as well as the WAN connectivity between them. Having distributed NFVI provides for reduced latency and improves the quality of experience because the NSs are placed closer to the end-users.

Further, the life cycle management of NSs and VNFs is improved because the VNPaaS supports distributed management which allows performing the management operations closer to the deployed VNFs and hosting environment. This reduces the communication overhead, especially for the operations frequently executed. It also allows to elastically scale the management capacity to adapt to the workload changes.

The VNPaaS can automate the life cycle management of NSs and VNFs. This automation takes into account the fact that VNFs vary in their requirements such as network connectivity requirements (e.g. bandwidth and QoS) and security.

Finally, VNFs have different deployment models; they can be deployed on bare-metal (i.e., physical resources) and virtual resources (e.g. virtual machines). Each of these deployment model guarantees different levels of security, isolation, and performance. The VNF requirements (e.g. security and frameworks), which are aligned with the intended SLA, are used to determine the deployment model. The proposed VNPaaS support hybrid deployment models and allow deploying VNFs on both physical and virtual resources.

Modifications and other embodiments will come to mind to one skilled in the art having the benefit of the teachings presented in the foregoing description and the associated drawings. Therefore, it is to be understood that modifications and other embodiments, such as specific forms other than those of the embodiments described above, are intended to be included within the scope of this disclosure. The described embodiments are merely illustrative and should not be considered restrictive in any way. The scope sought is given by the appended claims, rather than the preceding description, and all variations and equivalents that fall within the range of the claims are intended to be embraced therein. Although specific terms may be employed herein, they are used in a generic and descriptive sense only and not for purposes of limitations.

The invention claimed is:

1. An orchestration method (300), for execution by an orchestrator (100) for a Virtual Network Platform as a Service (VNPaaS), to orchestrate management of a Network Service (NS), comprising:
    selecting (302) an orchestration zone for each of a plurality of Virtual Network Functions (VNFs) (401, 402, 403) used in the NS based on selected deployment locations, wherein each orchestration zone comprises at least one VNF;
    associating (303) sub-services to said selected orchestration zones, said sub-services being obtained from a decomposition of the NS into a number of sub-services equal to a number of orchestration zones selected and each sub-service comprising at least one of the plurality of VNFs (401, 402, 403); and
    initiating deployment (304) of the sub-services in the selected orchestration zones.

2. The orchestration method of claim 1, wherein the decomposition of the NS into the sub-services is done by the orchestrator (100).

3. The orchestration method of claim 2, further comprising, before the step of selecting (302):
    parsing (305) a service template describing the NS;
    extracting (306), from the service template, the plurality of VNFs (401, 402, 403) used in the NS;
    obtaining (307) requirements for each VNF used in the NS from a VNF catalog repository (136);
    obtaining (308) resources availabilities for the selected deployment locations from a resources repository (137);
    selecting (309) resources to assign to each VNF according to the requirements for each VNF and to the resources availabilities; and
    selecting (310) the deployment locations for the plurality of VNFs used in the NS.

4. The orchestration method of claim 3, wherein the requirements for each VNF (401, 402, 403) comprise deployment requirements, operational requirements and behavioral requirements.

5. The orchestration method of claim 3, wherein the resources availabilities comprise compute, storage, Quality of Service (QoS) and bandwidth.

6. The orchestration method of claim 3, wherein the step of selecting (309) resources to assign to each VNF according to the requirements for each VNF and to the resources availabilities comprises using knowledge management techniques or machine learning techniques to generate a model that describes each VNF requirements and network requirements and updating the service template to include the generated model.

7. The orchestration method of claim 1, wherein each sub-service is described by a sub-service template.

8. The orchestration method of claim 7, further comprising, before the step of initiating (304), adding (311) publish and discovery operations to the sub-services templates, thereby providing operations to be used for composition of the sub-services to generate the NS.

9. The orchestration method of claim 8, wherein the publish operation is added to the sub-service template, by adding a new node, called VNF record, when a VNF is to be accessed by another VNF deployed in a different orchestration zone.

10. The orchestration method of claim 8, wherein the discovery operation is added to the sub-service template, by adding a new node, called discoverable service, when a VNF accesses another VNF deployed in different orchestration zone.

11. The orchestration method of claim 7, wherein the sub-service templates are built based on the service template describing the NS.

12. The orchestration method of claim 1, further comprising, if a deployment location has more than one orchestration zone, selecting only one orchestration zone based on a predefined criterion.

13. The orchestration method of claim 12, wherein the step of selecting (302) the orchestration zone based on the predefined criterion comprises selecting an orchestration zone which includes a minimum number of VNFs.

14. The orchestration method of claim 12, wherein the step of selecting (302) the orchestration zone based on the predefined criterion comprises selecting an orchestration zone based on resources types available, wherein said resources types include VMs and containers.

15. A non-transitory computer readable media having stored thereon instructions for execution of an orchestrator (100) for a Virtual Network Platform as a Service (VNPaaS), to orchestrate management of a Network Service (NS), the instructions comprising:
   selecting (302) an orchestration zone for each of a plurality of Virtual Network Functions (VNFs) (401, 402, 403) used in the NS based on selected deployment locations, wherein each orchestration zone comprises at least one VNF;
   associating (303) sub-services to said selected orchestration zones, said sub-services being obtained from a decomposition of the NS into a number of sub-services equal to a number of orchestration zones selected and each sub-service comprising at least one of the plurality of VNFs (401, 402, 403); and
   initiating deployment (304) of the sub-services in the selected orchestration zones.

16. The non-transitory computer readable media of claim 15, wherein the instructions further comprise that the decomposition of the NS into the sub-services is done by the orchestrator (100).

17. The non-transitory computer readable media of claim 16, wherein the instructions further comprise:
   parsing (305) a service template describing the NS;
   extracting (306), from the service template, the plurality of VNFs (401, 402, 403) used in the NS;
   obtaining (307) requirements for each VNF used in the NS from a VNF catalog repository (136);
   obtaining (308) resources availabilities for the selected deployment locations from a resources repository (137);
   selecting (309) resources to assign to each VNF according to the requirements for each VNF and to the resources availabilities; and
   selecting (310) deployment locations for the plurality of VNFs used in the NS.

18. The non-transitory computer readable media of claim 17, wherein the instructions further comprise that the requirements for each VNF (401, 402, 403) comprise deployment requirements, operational requirements and behavioral requirements.

19. The non-transitory computer readable media of claim 17, wherein the instructions further comprise that the resources availabilities comprise compute, storage, Quality of Service (QoS) and bandwidth.

20. The non-transitory computer readable media of claim 17, wherein the instructions further comprise that the step of selecting (309) resources to assign to each VNF according to the requirements for each VNF and to the resources availabilities comprises using knowledge management techniques or machine learning techniques to generate a model that describes each VNF requirements and network requirements and update the service template to include the generated model.

21. The non-transitory computer readable media of claim 15, wherein the instructions further comprise that each sub-service is described by a sub-service template.

22. The non-transitory computer readable media of claim 21, wherein the instructions further comprise adding (311) publish and discovery operations to the sub-service templates, thereby providing operations to be used for composition of the sub-services to generate the NS.

23. The non-transitory computer readable media of claim 21, wherein the instructions further comprise that the sub-service templates are built based on the service template describing the NS.

24. The non-transitory computer readable media of claim 22, wherein the instructions further comprise that the publish operation is added to the sub-service template, by adding a new node, called VNF record, when a VNF is to be accessed by another VNF deployed in a different orchestration zone.

25. The non-transitory computer readable media of claim 22, wherein the instructions further comprise that the discovery operation is added to the sub-service template, by adding a new node, called discoverable service, when a VNF accesses another VNF deployed in different orchestration zone.

26. The non-transitory computer readable media of claim 15, wherein the instructions further comprise, if a deployment location has more than one orchestration zone, selecting only one orchestration zone based on a predefined criterion.

27. The non-transitory computer readable media of claim 26, wherein the instructions further comprise that selecting the orchestration zone based on the predefined criterion comprises selecting an orchestration zone which includes a minimum number of VNFs.

28. The non-transitory computer readable media of claim 26, wherein the instructions further comprise that selecting the orchestration zone based on the predefined criterion comprises selecting an orchestration zone based on resources types available, wherein said resources types include VMs and containers.

29. A Virtual Network Platform as a Service (VNPaaS) system comprising an orchestrator (100) operative to orchestrate management of a Network Service (NS), said VNPaaS system comprising processing circuits (660) and a memory (690), said memory (690) containing instructions executable by said processing circuits (660) whereby said VNPaaS system is operative to:
   select (302) an orchestration zone for each of a plurality of Virtual Network Functions (VNFs) (401, 402, 403)

used in the NS based on selected deployment locations, wherein each orchestration zone comprises at least one VNF;

associate (303) sub-services to said selected orchestration zones, said sub-services being obtained from a decomposition of the NS into a number of sub-services equal to a number of orchestration zones selected and each sub-service comprising at least one of the plurality of VNFs (401, 402, 403); and initiate deployment (304) of the sub-services in the selected orchestration zones.

* * * * *